United States Patent
Sasaki et al.

(10) Patent No.: US 11,560,517 B2
(45) Date of Patent: Jan. 24, 2023

(54) PHOTOREACTIVE LIQUID CRYSTAL COMPOSITION, DISPLAY ELEMENT, OPTICAL ELEMENT, METHOD FOR MANUFACTURING DISPLAY ELEMENT, AND METHOD FOR MANUFACTURING OPTICAL ELEMENT

(71) Applicants: UNIVERSITY OF HYOGO, Kobe (JP); NAGAOKA UNIVERSITY OF TECHNOLOGY, Nagaoka (JP); NISSAN CHEMICAL INDUSTRIES, LTD., Chiyoda-ku (JP)

(72) Inventors: Tomoyuki Sasaki, Nagaoka (JP); Hiroshi Ono, Nagaoka (JP); Nobuhiro Kawatsuki, Himeji (JP); Kohei Goto, Funabashi (JP)

(73) Assignees: UNIVERSITY OF HYOGO, Kobe (JP); NAGAOKA UNIVERSITY OF TECHNOLOGY, Nagaoka (JP); NISSAN CHEMICAL INDUSTRIES, LTD., Chiyoda-ku (JP)

(*) Notice: Subject to any disclaimer, the term of this patent is extended or adjusted under 35 U.S.C. 154(b) by 90 days.

(21) Appl. No.: 16/922,479

(22) Filed: Jul. 7, 2020

(65) Prior Publication Data
US 2020/0332194 A1    Oct. 22, 2020

Related U.S. Application Data

(63) Continuation of application No. 15/115,554, filed as application No. PCT/JP2014/072697 on Aug. 29, 2014, now Pat. No. 10,752,839.

(30) Foreign Application Priority Data

Jan. 30, 2014 (JP) .............................. JP2014-016187

(51) Int. Cl.
*C09K 19/38* (2006.01)
*C09K 19/32* (2006.01)
(Continued)

(52) U.S. Cl.
CPC ........ *C09K 19/3852* (2013.01); *C09K 19/062* (2013.01); *C09K 19/12* (2013.01);
(Continued)

(58) Field of Classification Search
CPC .... C09K 19/12; C09K 19/14; C09K 19/3001; C09K 19/322; C09K 19/3833;
(Continued)

(56) References Cited

U.S. PATENT DOCUMENTS 5,498,450 A    3/1996  Akashi et al.
8,603,358 B2  12/2013  Kuriyama et al.
(Continued)

FOREIGN PATENT DOCUMENTS

JP    2005-272532         10/2005
JP    2005272532 A    *  10/2005
(Continued)

OTHER PUBLICATIONS

English translation of JP2005272532. (Year: 2005).*
(Continued)

*Primary Examiner* — Chanceity N Robinson
*Assistant Examiner* — Anna Malloy
(74) *Attorney, Agent, or Firm* — Oblon, McClelland, Maier & Neustadt, L.L.P.

(57) ABSTRACT

A photoreactive liquid crystal composition containing (A) a photoreactive polymer liquid crystal which includes a photoreactive side chain in which at least one type of reaction selected from (A-1) photocrosslinking and (A-2) photoisomerization occurs, and (B) a low molecular weight liquid
(Continued)

crystal. An optical element or display element is formed having a liquid crystal cell including the photoreactive liquid crystal composition.

13 Claims, 2 Drawing Sheets

(51) Int. Cl.
*C09K 19/06* (2006.01)
*C09K 19/20* (2006.01)
*C09K 19/14* (2006.01)
*C09K 19/30* (2006.01)
*C09K 19/12* (2006.01)
*C09K 19/44* (2006.01)
*C09K 19/04* (2006.01)
*G03H 1/02* (2006.01)

(52) U.S. Cl.
CPC .......... *C09K 19/14* (2013.01); *C09K 19/2014* (2013.01); *C09K 19/3001* (2013.01); *C09K 19/322* (2013.01); *C09K 19/38* (2013.01); *C09K 19/44* (2013.01); *C09K 2019/0448* (2013.01); *C09K 2019/122* (2013.01); *G03H 2001/0264* (2013.01); *G03H 2260/12* (2013.01); *G03H 2260/33* (2013.01)

(58) Field of Classification Search
CPC ........ C09K 19/3852; C09K 2019/0466; C09K 2019/123; C09K 2019/124; C09K 2019/3004; C09K 2019/3006; C09K 2019/301; C09K 2019/3077
See application file for complete search history.

(56) References Cited

U.S. PATENT DOCUMENTS

| 2002/0187282 | A1 | 12/2002 | Farrand et al. |
| 2003/0137633 | A1* | 7/2003 | Ito .................. G02B 5/3008 349/194 |
| 2004/0166250 | A1* | 8/2004 | Sakai .................. C08G 61/02 428/1.2 |
| 2005/0018272 | A1* | 1/2005 | Kimura .................. G02F 1/1326 359/295 |
| 2005/0083463 | A1* | 4/2005 | Sakai .................. G02B 5/3083 349/118 |
| 2005/0227021 | A1 | 10/2005 | Harding et al. |
| 2009/0073352 | A1 | 3/2009 | Hamilton et al. |
| 2013/0201435 | A1 | 8/2013 | Oh et al. |
| 2014/0002785 | A1 | 1/2014 | Choi et al. |

FOREIGN PATENT DOCUMENTS

| JP | 2011084477 A * | 4/2011 |
| WO | WO 2013/032283 A2 | 3/2013 |
| WO | WO 2013/081066 A1 | 6/2013 |

OTHER PUBLICATIONS

Jackson et al., "Alignment models for coumarin-containing polymers for liquid crystal displays", Jan. 1999, Proceedings of SPIE, vol. 3635, 38-47. (Year: 1999).*
Kawatsuki et al., "Photoinduced Orientation in Photo-cross-linkable Liquid Crystalline Polymer Film Containing Tolane Moiety", 2006, Chemistry Letters, vol. 35 No. 1, 52-53. (Year: 2006).*
Kawatsuki et al., "A photoinduced birefringent film with a high orientational order obtained from a novel polymer liquid crystal", Sep. 3, 2001, Advanced Materials, vol. 13, No. 7, 1337-1339. (Year: 2001).*
English translation of JP2011084477. (Year: 2011).*
International Search Report dated Dec. 2, 2014 in PCT/JP2014/072597.
Kawalsuki et al., "A photoinduced birefringent film with a high orientational order obtained from a novel polymer liquid clystal", Sep. 3, 2001, Advanced Materials, vol. 13, No. 7, 1337-1339.
Jackson et al., "Alignment models for coumarin-containing polymers for liquid crystal displays", Jan. 1999, Proceedings of SPIE, vol. 3635, 38-47.
Kawatsuki et al., "Photoinduced Orientation in Photo-cross-linkable Liquid Crystalline Polymer Film Containing Tolane Moiety", 2006, Chemistry Letters, vol. 35 No. 1, 52-53.

* cited by examiner

PHOTOREACTIVE LIQUID CRYSTAL COMPOSITION, DISPLAY ELEMENT, OPTICAL ELEMENT, METHOD FOR MANUFACTURING DISPLAY ELEMENT, AND METHOD FOR MANUFACTURING OPTICAL ELEMENT

CROSS-REFERENCE TO RELATED APPLICATIONS

This application is a continuation of U.S. application Ser. No. 15/115,554, filed on Jul. 29, 2016, which is a national stage patent application of international patent application PCT/JP2014/072697, filed on Aug. 29, 2014, the text of which is incorporated by reference, and claims foreign priority to Japanese Patent Application No. 2014-016187, filed on Jan. 30, 2014, the entire content of which is incorporated herein by reference.

TECHNICAL FIELD

The present invention relates to a photoreactive liquid crystal composition, a display element and an optical element comprised of the photoreactive liquid crystal composition, and methods for manufacturing a display element and an optical element.

BACKGROUND ART

A current liquid crystal display element has used a liquid crystal alignment film which has been subjected to an alignment treatment in order to make the liquid crystal uniformly aligned, except for some elements such as a polymer dispersed liquid crystal (PDLC) (Non-Patent Literature 1). The alignment treatment of the liquid crystal alignment film has had, after the liquid crystal alignment film is applied, a process generally called a rubbing treatment, that is, a process for rubbing a film surface with a roller having cloth wrapped around. However, since the process is the step of rubbing the film surface physically, scratches and/or shavings due to the rubbing process deteriorate display performance of a liquid crystal display element disadvantageously. Further, this alignment treatment needs to go through many steps such as a liquid crystal alignment film formation step, a liquid crystal alignment treatment step, and a liquid crystal alignment film cleaning step, thereby complicating the manufacturing process.

Therefore, in view of process and cost, it is largely advantageous to manufacture a liquid crystal cell capable of controlling orientation of a liquid crystal without the liquid crystal alignment film.

Meanwhile, a diffraction grating, which is capable of branch of a light wave, conversion or a propagation direction, condensing dispersion, or the like, has been widely used as a passive element in an optical electronics field such as optical recording or optical information transmission.

A typical manufacturing method is a method using a photoresist used for forming a semiconductor integrated circuit or the like. However, a diffraction element formed in this way has no optical anistropy, or does not easily form periodic optical anistropy controlled, and thus cannot control, a polarization state. In order to control polarization, it is necessary to control optical anisotropy highly, and to form a structure having periodicity. Therefore, for example, it has been proposed to utilize an axis-selective photoreaction of polyvinyl cinnamate (PVCi) or azobenzene capable of generating optical anisotropy simultaneously when change in a refractive index is caused by a photochemical reaction.

However, birefringence induced in the axis-selective photoreaction of PVCi is as very small as 0.01. Also azobenzene, large birefringence is not induced. Since characteristics are changed by an external field such as heat or light, or since light absorption occurs in a visible region, it is difficult to apply PVCi or azobenzene to a passive optical device, which requires high stability.

More, in recent years, realization of a polarization control type diffraction element capable of controlling diffraction characteristics by an electric field has been expected. It is disclosed (Patent Literature 1) that an optical diffraction liquid crystal element characterized by including a polymerization layer having a periodically varying and fixed molecular orientation structure and a low molecular liquid crystal layer. If an orientation state of a liquid crystal can be controlled arbitrarily in a liquid crystal bulk, various optical elements, for example, a diffraction grating having a periodic orientation distribution, a lens, a mirror, and the like can be provided (Non-Patent Literature 2 or 3). However, in a case of the diffraction grating of the structure, in forming a polymerization layer having a molecular orientation structure, it is necessary to perform an alignment treatment, and manufacturing of the diffraction grating is complicated disadvantageously.

PRIOR ART DOCUMENT

Patent Document

[Patent Document 1] JP-A-2006-20388.

Non-Patent Document

[Non-Patent Document 1] Liquid Crystal Handbook MARUZEN Company Limited.
[Non-Patent Document 2] S. Sato, Jpn. J. Appl. Phys. 18, 1679 (1979).
[Non-Patent Document 3] T. Scharf, Polarized Light in Liquid Crystals and Polymers (Wiley, 2007)

DISCLOSURE OF THE INVENTION

Problems to be Solved by the Invention

An object of the present invention is to provide an element, specifically a display element and an optical element, obtained controlling orientation of a liquid crystal in a liquid crystal bulk without a liquid crystal alignment film, and/or to provide a photoreactive liquid crystal composition for manufacturing the element.

Further, in addition to, or other than the above objects, an object of the present invention is to provide a method for manufacturing an element obtained by controlling orientation of a liquid crystal in a liquid crystal bulk without a liquid crystal alignment film.

Means for Solving Problems

The present inventors have found the following inventions:
<1> A photoreactive liquid crystal composition comprising:
(A) a photoreactive polymer liquid crystal having a photoreactive side chain, which causes at least one reaction selected from the group consisting of (A-1) photocrosslinking, and (A-2) photoisomerization; and (B) a low molecular liquid crystal.

<2> In the above item <1>, the (A) photoreactive polymer liquid crystal may comprise a photoreactive side chain, which causes the (A-1) photocrosslinking reaction.

<3> In the above item <1> or <2>, a weight ratio of the (A) photoreactive polymer liquid crystal and the (B) low molecular liquid crystal ((A) photoreactive polymer liquid crystal: (B) low molecular liquid crystal) may be 0.1:99.9 to 20:80, preferably 0.5:99.5 to 15:85, more preferably 0.8:99.2 to 10:90.

<4> In any one of the above items <1> to <3>, the (A) photoreactive polymer liquid crystal may comprise any one photoreactive side chain selected from the group consisting of the following formulae (1) to (6):

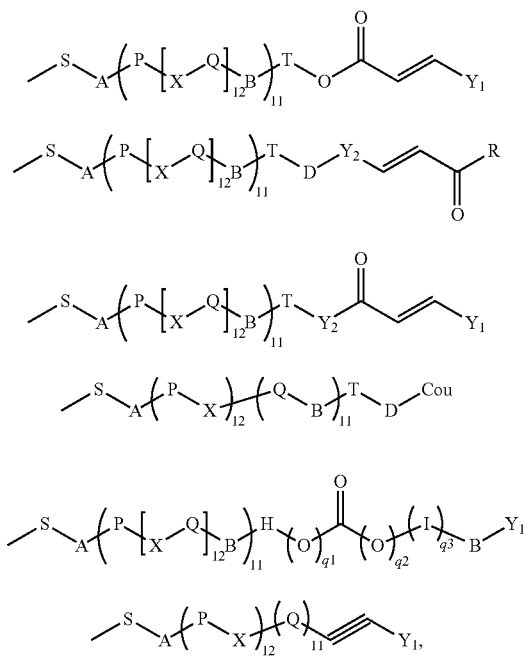

wherein A, B, and D each independently represents a single bond, —O—, —CH$_2$—, —COO—, —OCO—, —CONH—, —NH—CO—, —C=CH—CO—O—, or —O—CO—CH=CH—;

S represents an alkylene group having 1 to 12 carbon atoms, wherein a hydrogen atom bonded thereto may be replaced with a halogen group;

T represents a single bond or an alkylene group having 1 to 12 carbon atoms, wherein a hydrogen atom bonded thereto may be replaced with a halogen group;

Y$_1$ represents a ring selected from a monovalent benzene ring, a monovalent naphthalene ring, a monovalent biphenyl ring, a monovalent, furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

Y$_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or has the same definition as Y$_1$;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

Cou represents a coumarin-6-yl group or a coumarin-7-yl group, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

q3 is 0 or 1;

P and Q each independently represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, in proviso that in a case where X is —CH=CH—CO—O— or —O—CO—CH=CH—, P or Q on a side to which —CH=CH— is bonded is an aromatic ring, in a case where the number of P is 2 or more, these Ps may be the same or different, and in a case where the number of Q is 2 or more, these Qs may be the same or different;

l1 represents 0 or 1;

l2 represents an integer of 0 to 2;

in a case where both l1 and l2 are 0 and T is a single bond, A also represents a single bond;

in a case where l1 is 1 and T is a single bond, B also represents a single bond; and H and I each independently represents a group selected from a bivalent benzene ring, a bivalent naphthalene ring, a bivalent biphenyl ring, a bivalent furan ring, a bivalent pyrrole ring and a combination thereof.

<5> In any one of the above items <1> to <4>, the (A) photoreactive polymer liquid crystal may comprise any one photoreactive side chain selected from the group consisting of the following formulae (7) to (10):

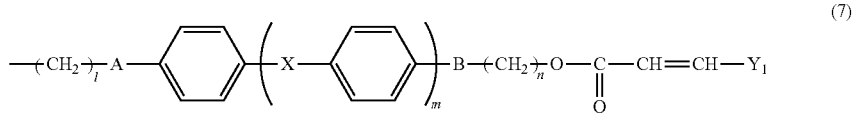

-continued

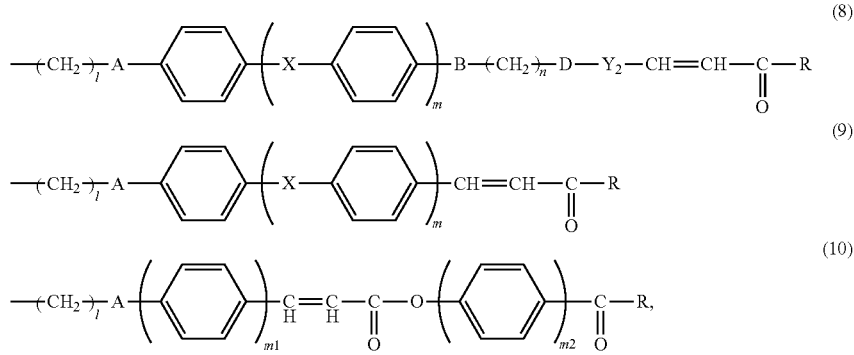

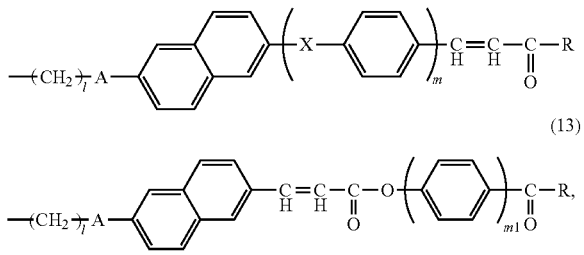

wherein A, B, and D each independently represents a single bend, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 9 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

l represents an integer of 1 to 12;

m represents an integer of 0 to 2, and each of m1 and m2 represents an integer of 1 to 3;

n represents an integer of 0 to 12 (when n=0, B represents a single bond);

Y$_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms; and R represents a hydroxy group, an alkoxy group having 1 to 6 carbon atoms, or has the same definition as Y$_1$.

<6> In any one of the above items <1> to <4>, the (A) photoreactive polymer liquid crystal may comprise any one photoreactive side chain selected from the group consisting of the following formulae (11) to (13):

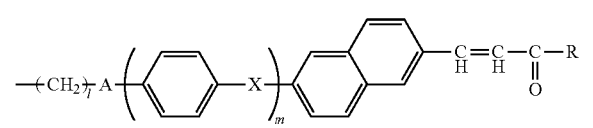

wherein A independently represents a single bond, —O—, —CH$_2$—, —COO—, —OCO—, —CONH—, —NH—CO—, —CH=CH—CO—O—, or —O—CO—CH=CH—;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

l represents an integer of 1 to 12, m represents an integer of 0 to 2, and m1 represents an integer of 1 to 3; and R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six ring selected therefrom are bonded through a bonding group B, wherein, a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN a halogen group, an alkyl group having 1 to 5 carbon atoms, or an alkyloxy group having 1 to 5 carbon atoms, a hydroxy group, or an alkoxy group having 1 to 6 carbon atoms.

<7> In any one of the above items <1> to <4>, the (A) photoreactive polymer liquid crystal may comprise a photoreactive side chain represented by the following formula (14) or (15):

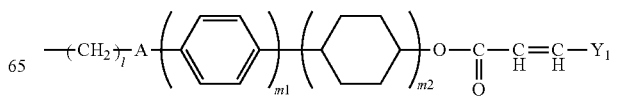

-continued

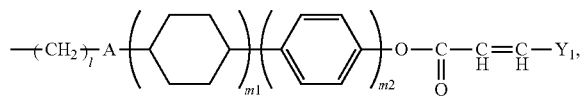
(15)

wherein A represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to rings selected therefrom are bonded through a bonding group B, wherein hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having to 5 carbon atoms;

l represents an integer of 1 to 12, and each of m1 and m2 represents an integer of 1 to 3.

<8> In any one of the above items <1> to <4>, the (A) photoreactive polymer liquid crystal may comprise a photoreactive side chain represented by the following formula (16) or (17):

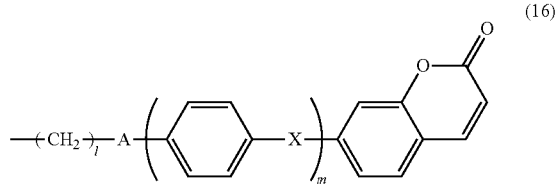
(16)

(17)

wherein A represents a single bond, —O—, —CH$_2$—, —COO—, —OCO—, —CONH—, —NH—CO—O, —CH=CH—CO—O—, or —O—CO—CH=CH—;

X represents a single bond, —COO—, —OCO—, —N=N—, —CH=CH—, —CH≡C—, —CH=CH—CO—O—, or —O—CO—CH=CH—, and in a case where the number of X is 2, these Xs may be the same or different; and l represents an integer of 1 to 12, and m represents an integer of 0 to 2.

<9> in any one of the above items <1> to <4>, the (A) photoreactive polymer liquid crystal may comprise a photoreactive side chain represented by the following formula (20):

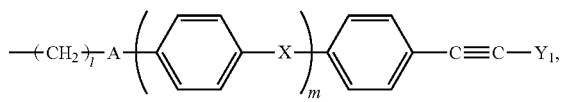
(20)

wherein A represents a single bond, —O—, —CH$_2$—, —COO—, —OCO—, —CONH—, —NH—CO—, —CH=CH—CO—O—, or —O—CO—CH=CH—;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different; and l represents an integer of 1 to 12, and m represents an integer of 0 to 2.

<10> A display element comprised of a liquid crystal cell comprising the photoreactive liquid crystal composition described in any one the above items <1> to <9>.

<11> A display element comprised liquid crystal comprising the photoreactive liquid crystal composition described in any one of the above items <1> to <9>, wherein the (B) low molecular liquid crystal has predetermined orientation in the crystal cell.

<12> An optical element comprised of a liquid crystal cell comprising the photoreactive liquid crystal composition described in any one the above ems <1> to <9>.

<13> An optical element comprised of a liquid crystal cell comprising the photoreactive liquid crystal composition described in any one of the above items <1> to <9>, wherein the (B) low molecular liquid crystal has predetermined orientation in the liquid crystal cell.

<14> In the above item 12> or <13>, the predetermined orientation may have an orientation distribution in which orientation is different depending on the position of the optical element.

<15> A method for manufacturing an optical element, comprising the steps of:

[I] filling a photoreactive liquid crystal composition comprising (A) a photoreactive polymer liquid crystal having a photoreactive side chain, which cause, at least one reaction selected from the group consisting of (A-1) photocrosslinking and (A-2) photoisomerization; and (B) a low molecular liquid crystal; into a space formed between two transparent substrates disposed in parallel and apart from each other, to form a liquid crystal cell; and

[II] irradiating the liquid crystal cell obtained in the step [I] with a polarized ultraviolet ray from one of the two transparent substrates;

to form the optical element having a predetermined orientation of the (B) low molecular liquid crystal in the liquid crystal cell.

<16> In the step [II] of the above item <15>, setting a polarizing axis of a polarized ultraviolet ray with respect to a first position of the optical element as a first axis, and setting a polarizing axis of a polarized ultraviolet ray with respect to a second position, which is different from the first position of the optical element, as a second axis, which is different from the first axis, to form the optical element having the (B) low molecular liquid crystal with different orientations between the first and second positions of the optical element.

<17> In the step [II] of the above item <15>, being subject to interference exposure of the polarized ultraviolet ray, the predetermined orientation may have an orientation distribution in which orientation is different depending on the position of the optical element.

<18> A method for manufacturing a display element, comprising the steps of:

[I] filling a photoreactive liquid crystal composition comprising (A) a photoreactive polymer liquid crystal having a photoreactive side chain, which causes at least one reaction selected from the group consisting of (A-1) photocrosslinking and (A-2) photoisomerization; and (B) a low molecular liquid crystal; into a space formed between two transparent substrates disposed in parallel and apart from each other, to form a liquid crystal cell; and

[II] irradiating the liquid crystal cell obtained in the step [I] with a polarized ultraviolet ray from one of the two transparent substrates;

to form the display element having a predetermined orientation of the (B) low molecular liquid crystal in the liquid crystal cell.

Effects of the Invention

The present invention can provide an element, specifically a display element and an optical element, obtained by controlling orientation of a liquid crystal in a liquid crystal bulk without a liquid crystal alignment film, and/or to provide a photoreactive liquid crystal composition for manufacturing the element.

Further, in addition to, or other than the above effects, the present invention can provide a method for manufacturing an element obtained by controlling orientation, of a liquid crystal in a liquid crystal bulk without a liquid crystal alignment film.

EMBODIMENTS FOR CARRYING OUT THE INVENTION

Figure 1:
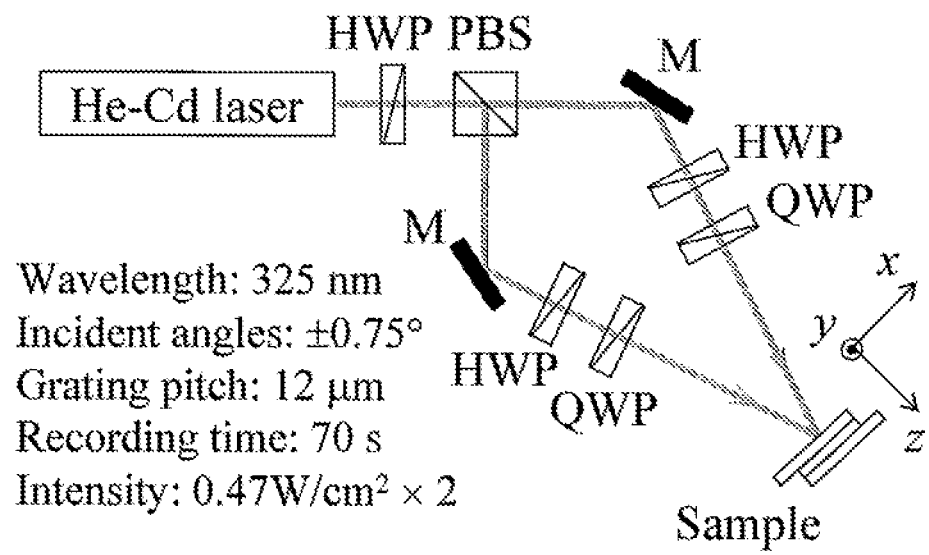
FIG. 1 illustrates an optical path diagram for performing hologram exposure in Example 1 and Comparative Example 1.

The present application provides an element, specifically a display element and an optical element, obtained by controlling orientation of a liquid crystal in a liquid crystal bulk without a liquid crystal alignment film, and/or provides a photoreactive liquid crystal composition for manufacturing the element.

In addition, the present application provides a method for manufacturing an element obtained by controlling orientation of a liquid crystal in a liquid crystal bulk without a liquid crystal alignment film.

The photoreactive liquid crystal composition, the element obtained by the composition, and the method for manufacturing the element are described hereinafter.

<Photoreactive Liquid Crystal Composition>

The photoreactive liquid crystal composition according to the present invention comprises (A) a photoreactive polymer liquid crystal having a photoreactive side chain, which causes at least one reaction selected from the group consisting of (A-1) photocrosslinking and (A-2) photoisomerization; and (B) a low molecular liquid crystal.

The photoreactive liquid crystal composition according to the present invention may consist of the (A) photoreactive polymer liquid crystal and the (B) low molecular liquid crystal, or may consist essentially of (A) and (B), including other components to such an extent that properties of (A) and (B) are net changed. Further, the photoreactive liquid crystal composition according to the present invention may comprise other components other than (A) or (B). <<(B) Low Molecular Liquid Crystal>>

The (B) low molecular liquid crystal included in the photoreactive liquid crystal composition according to the present invention may use a nematic liquid crystal, a ferroelectric liquid crystal or the like as it is, which have been conventionally used for a liquid crystal display element or the like.

Specific examples of the (B) low molecular liquid crystal may include, but are not limited to, cyanobiphenyls such as 4-cyano-4'-n-pentyl biphenyl, 4-cyano-4'-n-heptyloxy biphenyl or the like; cholesteryl esters such as cholesteryl acetate, cholesteryl benzoate or the like; carbonate esters such as 4-carboxyphenyl ethyl carbonate, 4-carboxyphenyl-n-butyl carbonate or the like; phenyl esters such as phenyl benzoate, biphenyl phthalate or the like; Schiff's bases such as benzylidene-2-naphthylamine, 4'-n-butoxybenzylidene-4-acetyl aniline or the like; benzidines such as N,N'-bisbenzylidene benzidine, p-dianisalbenzidine or the like; azoxybenzenes such as 4,4'-azoxy dianisole, 4,4'-di-n-butoxy azoxybenzene or the like; liquid crystals such as phenylcyclohexyls, terphenyls, phenyl bicyclohexyls or the like, specifically indicated below.

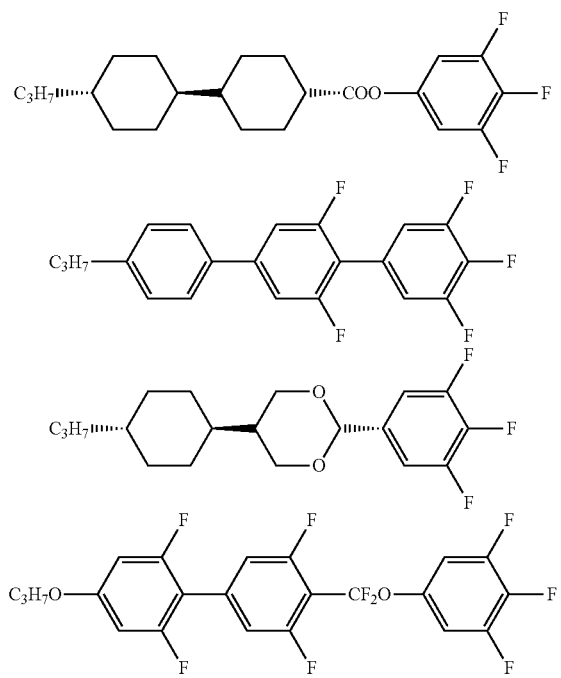

-continued

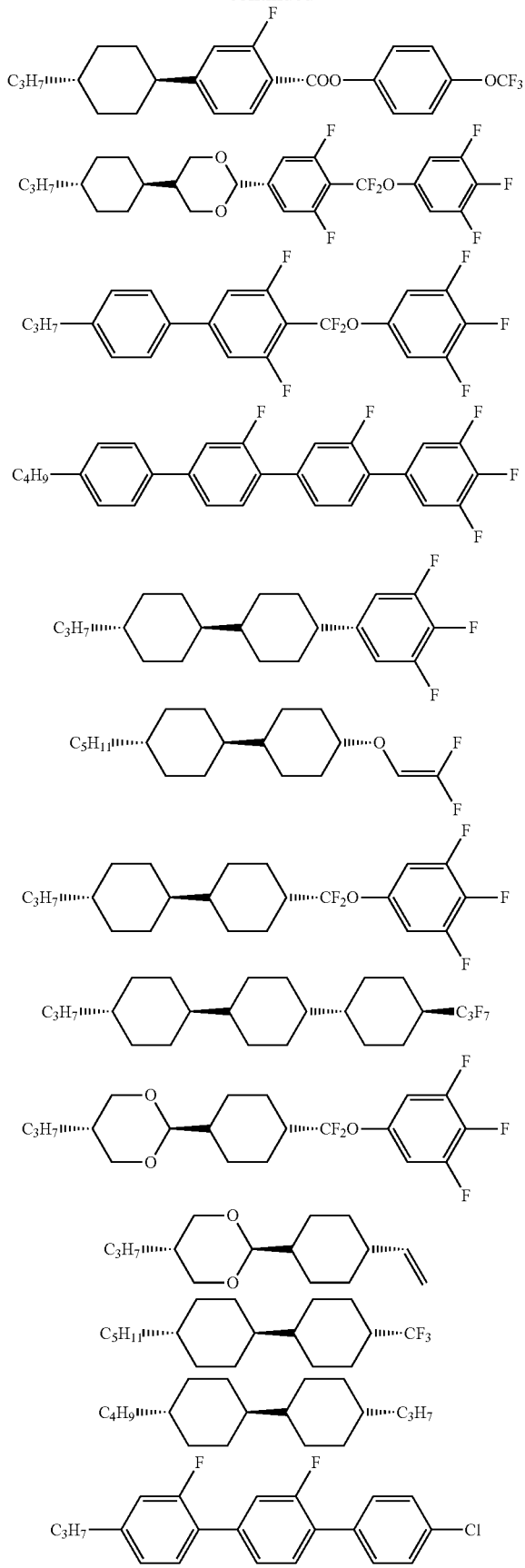

-continued

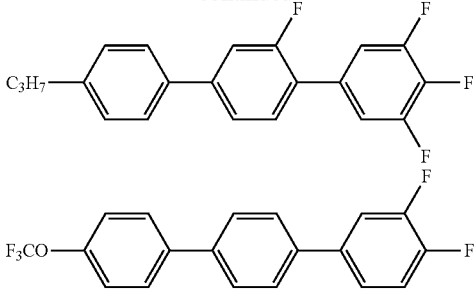

<<(A) Photoreactive Polymer Liquid Crystal>>

The (A) photoreactive polymer liquid crystal (hereinafter, also referred to as "component (A)" simply) included in the photoreactive liquid crystal composition according to the present invention is not particularly limited as long as having a photoreactive side chain, which causes at least one reaction selected from the group consisting of the (A-1) photocrosslinking and the (A-2) photoisomerization.

Photoreactivity used herein means a property to cause one or both of the (A-1) photocrosslinking and the (A-2) photoisomerization.

The component (A) may have a side chain, which causes the photocrosslinking reaction (A-1).

The component (A) is i) a polymer exhibiting liquid crystalline property in a predetermined temperature range and having a photoreactive side chain.

The component (A) ii) may react by light in a wavelength range of 250 nm to 400 nm and may exhibit liquid crystalline property in a temperature range of 50 to 300° C.

The component (A) iii) may preferably have a photoreactive side chain to react with light in a wavelength range of 250 nm to 400 nm, particularly with a polarized ultraviolet ray.

The component (A) iv) may preferably have a mesogenic group in order to exhibit liquid crystalline property a temperature range of 50 to 300° C.

In the photoreactive liquid crystal composition according to the present invention, a weight ratio of the (A) photoreactive polymer liquid crystal and the (B) low molecular liquid crystal ((A) photoreactive polymer liquid crystal: (B) low molecular liquid crystal) may be from 0.1:99.9 to 20:80, preferably from 0.5:99.5 to 15:85 and more preferably from 0.8:99.2 to 10:90.

As described above, the component (A) has a photoreactive side chain having photoreactivity. The structure of the side chain is not particularly limited, but causes a reaction indicated in the above (A-1) and/or (A-2), and preferably causes the (A-1) photocrosslinking reaction. A structure to cause the (A-1) photocrosslinking reaction is preferable because the structure after the reaction can hold orientation of the component (A) stably for a long time even when the structure after the reaction is exposed to an external stress such as heat.

The structure of the side chain of the component (A) may preferably comprise a rigid hemogenic component due to stable orientation of a liquid crystal.

Examples of the hemogenic component may include, but are not limited to, a biphenyl group, a terphenyl group, a phenyl cyclohexyl group, a phenyl benzoate group, an azobenzene group and the like.

The structure of a main chain of the component (A), for example, may include, but is not limited to, at least one selected from the group consisting of radically polymerizable groups such as hydrocarbons, (meth)acrylates, itaconates, fumarates, maleates, α-methylene-γ-butyrolactones, styrenes, vinyl, maleimides, and norbornenes and siloxanes.

The side chain of the component (A) may be at least one of the following formulae (1) to (6):

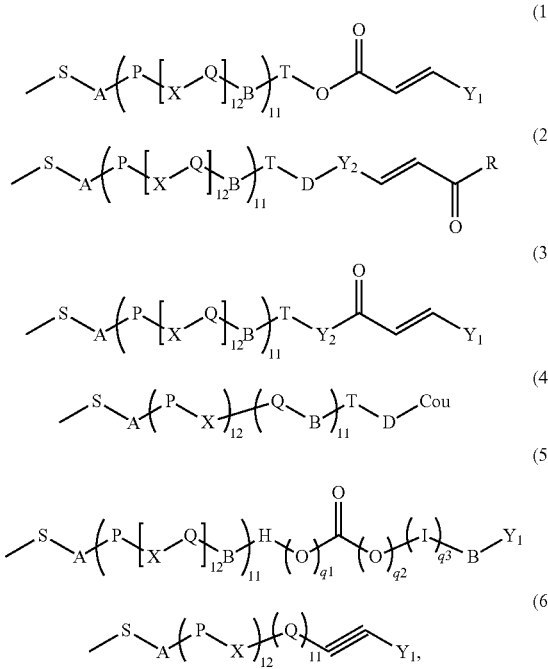

wherein A, B, and D each independently represents a single bond, —O—, —CH$_2$—, —COO—, —OCO—, —CONH—, —NH—CO—, —CH=CH—CO—O—, or —O—CO—CH=CH—;

S represents an alkylene group having 1 to 12 carbon atoms, wherein a hydrogen atom bonded thereto may be replaced with a halogen group;

T represents a single bond or an alkylene group having 1 to 12 carbon atoms, wherein a hydrogen atom bonded thereto may be replaced with a halogen group;

Y$_1$ represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 9 carbon atoms, or represents a group in which the same or different two to six rings selected therefrom are bonded through a bonding group B, wherein a hydrogen atom bonded thereto may be each independently replaced with —COOR$_0$ (wherein R$_0$ represents a hydrogen atom or an alkyl group having 1 to 5 carbon atoms), —NO$_2$, —CN, —CH=C(CN)$_2$, —CH=CH—CN, a halogen group, an alkyl group having 1 to 5 carbon atoms, or an alkyloxy group having 1 to 5 carbon atoms;

Y$_2$ represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

R represents a hydroxy group, an alkoxy group having 1 to 6 carbon atoms, or has the same definition as Y$_1$;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

Cou represents a coumarin-6-yl group or a coumarin-7-yl group, wherein a hydrogen atom bonded thereto may be each independently replaced with —NO$_2$, —CN, —CH=C(CN)$_2$, —CH=CH—CN, a halogen group, an alkyl group having 1 to 5 carbon atoms, or an alkyloxy group having 1 to 5 carbon atoms;

one of q1 and q2 is 1, and another is 0;

q3 is 0 or 1;

P and Q each independently represents a group selected from the group consisting of a bivalent benzene ring, a bivalent naphthalene ring, a bivalent biphenyl ring, a bivalent furan ring, a bivalent pyrrole ring, a bivalent alicyclic hydrocarbon having 5 to 8 carbon atoms and a combination thereof, in proviso that in a case where X is —CH=CH—CO—O— or —O—CO—CH=CH—, P or Q on a side to which —CH=CH— is bonded is an aromatic ring, in a case where the number of P is 2 or more, these Ps may be the same or different, and in a case where the number of Q is 2 or more, these Qs may be the same or different;

l1 represents 0 or 1;

l2 represents an integer of 0 to 2;

in a case where both l1 and l2 are 0 and T is a single bond, A also represents a single bond;

in a case where l1 is 1 and T is a single bond, B also represents a single bond; and H and I each independently represents a group selected from a bivalent benzene ring, a bivalent naphthalene ring, a bivalent biphenyl ring, a bivalent furan ring, a bivalent pyrrole ring and a combination thereof.

The side chain may be any one photoreactive side chain selected from the group consisting of the following formulae (7) to (10):

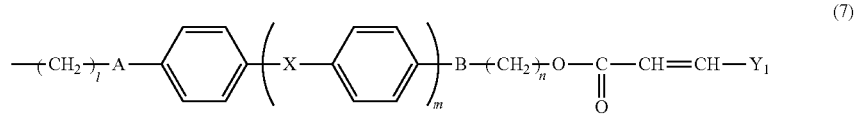

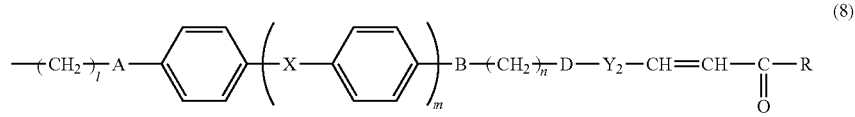

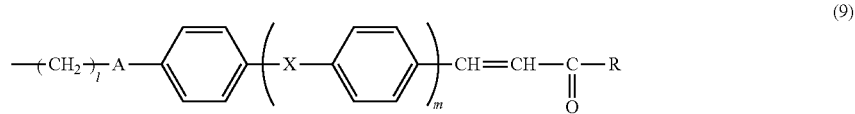

-continued

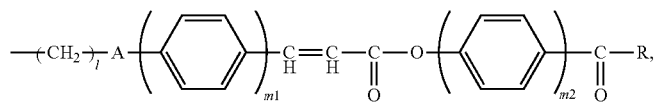
(10)

wherein A, B, D, Y₁, X, Y₂, and R each has the same definition as mentioned above;
l represents an integer of 1 to 12;
m represents an integer of 0 to 2, and each of m1 and m2 represents an integer of 1 to 3;
n represents an integer of 0 to 12 (when n=0, B represents a single bond).

The side chain may be any one photoreactive side chain selected from the group consisting of the following formulae (11) to (13):

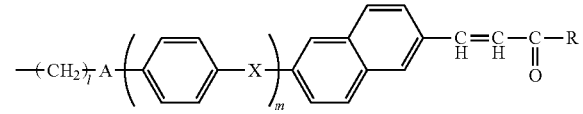
(11)

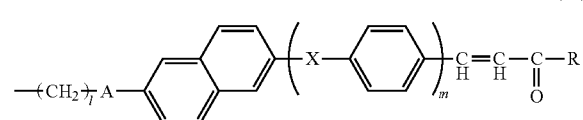
(12)

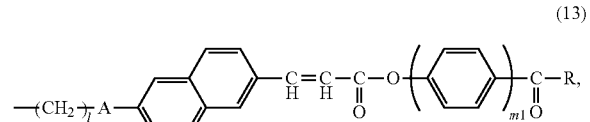
(13)

wherein A, X, l, m, m1 and R each has the same definition as mentioned above.

The side chain may be a photoreactive side chain represented by the following formula (14) or (15):

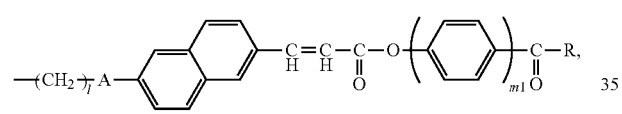
(14)

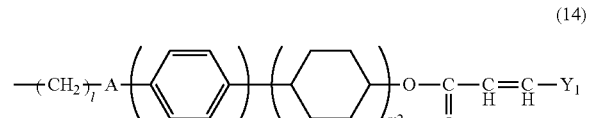
(15)

wherein A, Y₁, l, m1 and m2 each has the same definition as mentioned above.

The side chain may be a photoreactive side chain represented by the following formula (16) or (17):

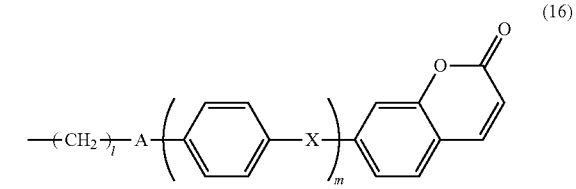
(16)

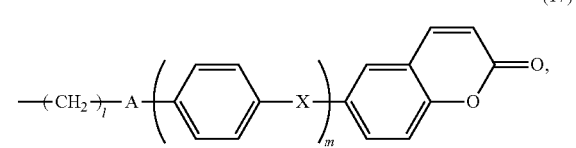
(17)

wherein A, X, l and m each has the same definition as mentioned above.

The side chain may be a photoreactive side chain represented by the following formula (20):

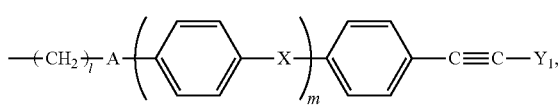
(20)

wherein A, Y₁, X, l and m each has the same definition as mentioned above.

Further, the component (A) may comprise any one liquid crystalline side chain selected from the group consisting of the following formulae (21) to (31). For example, in a case where a photoreactive side chain in the component (A) does not have liquid crystalline property, or in a case where a main chain in the component (A) does not have liquid crystalline property, the component (A) may comprise any one liquid crystalline side chain selected from the group consisting of the following formulae (21) to (31):

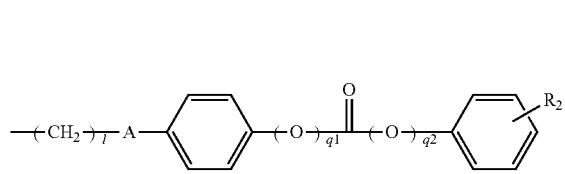
(21)

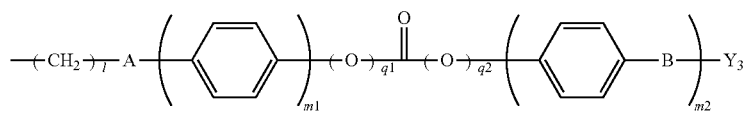
(22)

-continued

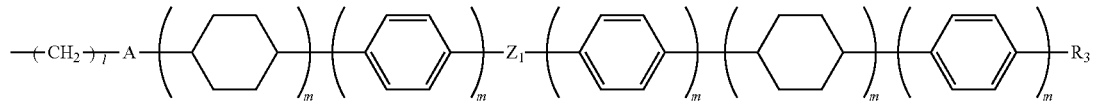
(23)

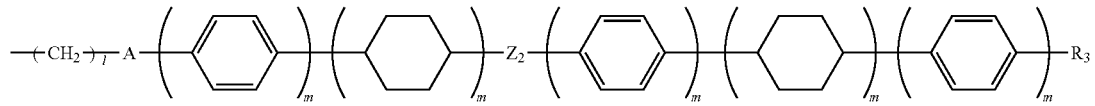
(24)

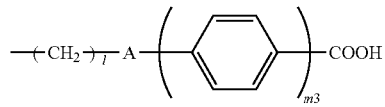
(25)

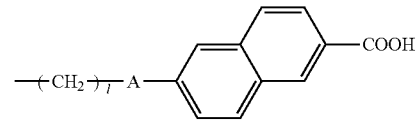
(26)

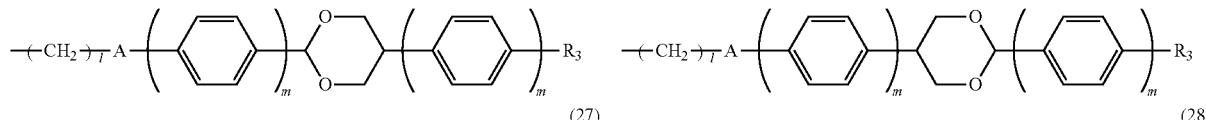
(27)

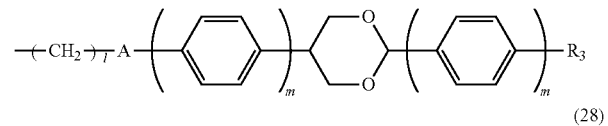
(28)

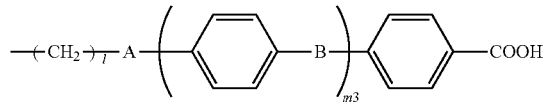
(29)

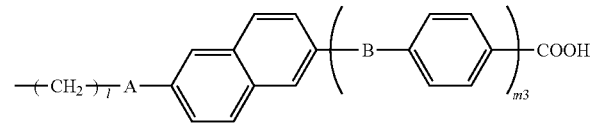
(30)

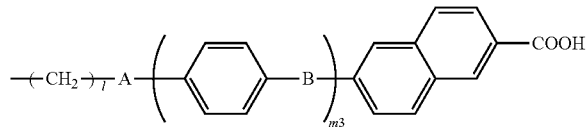
(31)

wherein A, B, q1 and q2 each has the same definition as mentioned above;

$Y_3$ represents a group selected from a monovalent benzene ring, a monovalent naphthalene ring, a monovalent biphenyl ring, a monovalent furan ring, a monovalent nitrogen-containing heterocyclic ring, and a monovalent alicyclic hydrocarbon having 5 to 8 carbon atoms, and a combination thereof, wherein a hydrogen atom bonded thereto may be each independently replaced with —$NO_2$, —CN, a halogen group, an alkyl group having 1 to 5 carbon atoms, or an alkyloxy group having 1 to 5 carbon atoms;

$R_3$ represents a hydrogen atom, —$NO_2$, —CN, —CH=C$(CN)_2$, —CH=CH—CN, a halogen group, a monovalent benzene ring, a monovalent naphthalene ring, a monovalent biphenyl ring, a monovalent furan ring, a monovalent nitrogen-containing heterocyclic ring, a monovalent alicyclic hydrocarbon having 5 to 8 carbon atoms, an alkyl group having 1 to 12 carbon atoms, or an alkoxy group having 1 to 12 carbon atoms;

l represents an integer of 1 to 12; m represents an integer of 0 to 2, in proviso that all sum of m is 2 or more in the formula (23) or (24), that all sum of m is 1 or more in the formula (25) or (26);

m1, m2 and m3 independently represents an integer of 1 to 3;

$R_2$ represents a hydrogen atom, —$NO_2$, —CN, a halogen group, a monovalent benzene ring, a monovalent naphthalene ring, a monovalent biphenyl ring, a monovalent furan ring, a monovalent nitrogen-containing heterocyclic ring, and a monovalent alicyclic hydrocarbon having 5 to 8 carbon atoms, and an alkyl group or an alkyloxy group;

$Z_1$ and $Z_2$ independently represents a single bond, —CO—, —$CH_2O$—, —CH=N—, or —$CF_2$—.

<<Method for Manufacturing a Component (A)>>

The component (A) can be obtained by polymerizing a photoreactive side chain monomer having the above photoreactive side chain, or in some cases, by copolymerizing the photoreactive side chain monomer and a monomer having the above liquid crystalline side chain.

[Photoreactive Side Chain Monomer]

The photoreactive side chain monomer used herein means a monomer which can form a polymer having a photoreactive side chain on a side chain portion of the polymer when the polymer is formed.

The photoreactive group in the side chain may be preferably the following structure or a derivative thereof.

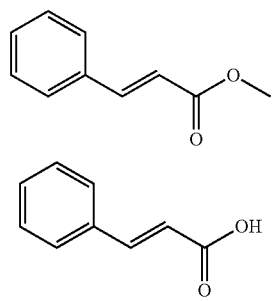

-continued

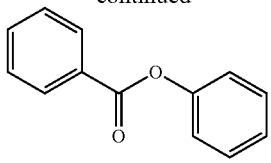
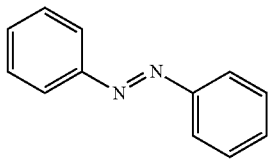
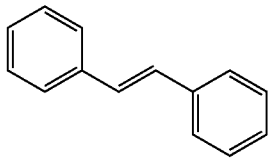
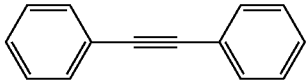
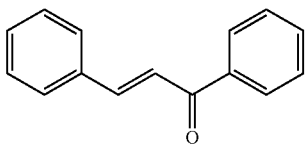

-continued

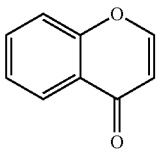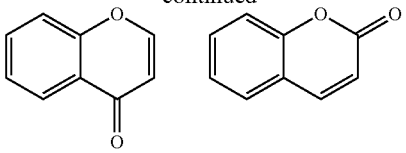

As a more specific example of the photoreactive side chain monomer, the photoreactive side chain monomer preferably has a structure including a polymerizable group formed of at least one selected from the group consisting of radically polymerizable groups such as hydrocarbons, (meth)acrylates, itaconates, fumarates, maleates, α-methylene-γ-butyrolactone, styrenes, vinyls, maleimides, and norbornenes and siloxanes, and a photoreactive side chain formed of at least one of the above formulae (1) to (6), preferably, for example, a photoreactive side chair, formed of at least one of the above formulae (7) to (10), a photoreactive side chain formed of at least one of the above formulae (11) to (13), a photoreactive side chain represented by the above formula (14) or (15), a photoreactive side chain represented by the above formula (16) or (17), or a photoreactive side chain represented by the above formula (20).

Examples of the photoreactive side chain monomer may include, but are not limited to, compounds represented by the following formulae PRM-1 to PRM-11, wherein n represents an integer of 1 to 6, m represents an integer of 0 to 4, X represents a hydrogen atom or a methyl group, R represents a hydrogen atom, a linear or branched alkyl group or alkoxy group having 1 to 3 carbon atoms, a halogen atom, a cyano group, or a nitro group, $R_1$ to $R_3$ each independently represent a hydrogen atom, a linear or branched alkyl group or alkoxy group having 1 to 3 carbon atoms, or a halogen atom, and p represents an integer of 1 to 4.

PRM-1

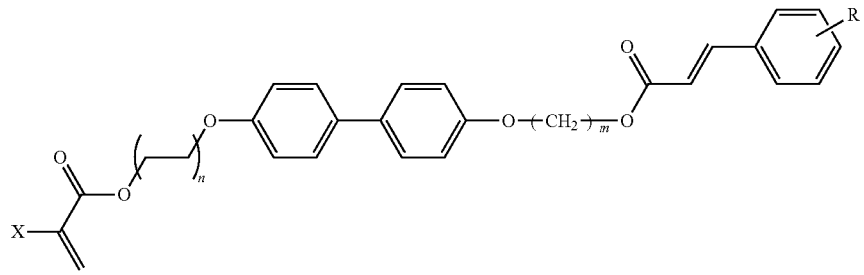

PRM-2

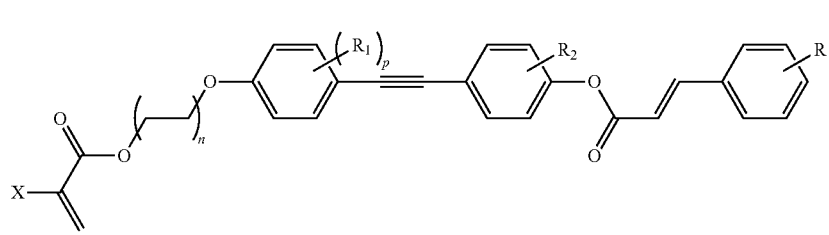

PRM-3

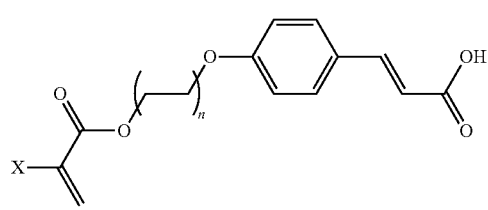

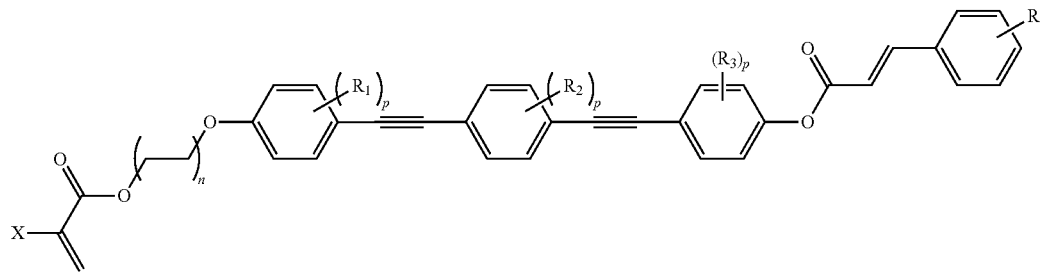
PRM-4

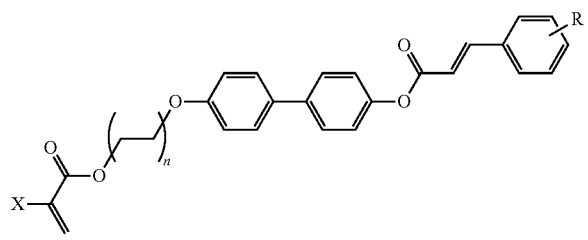
PRM-5

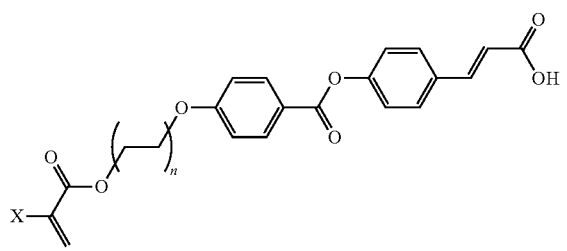
PRM-6

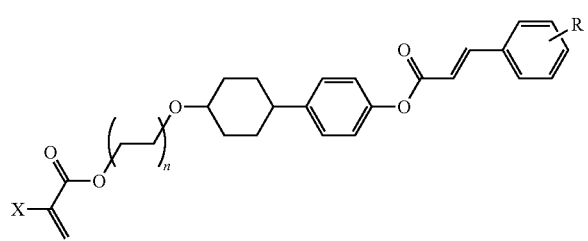
PRM-7

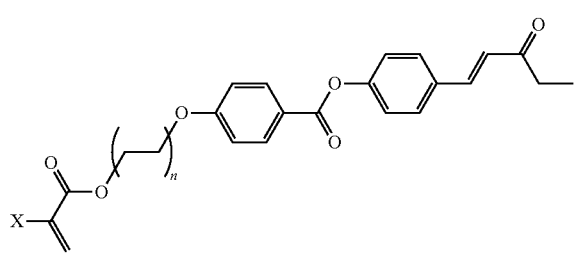
PRM-8

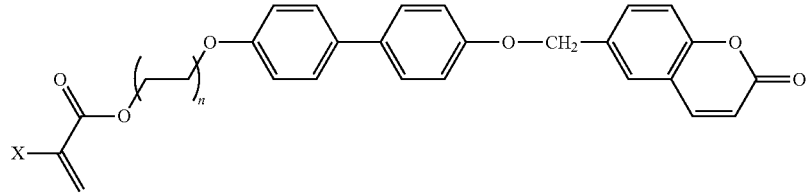
PRM-9

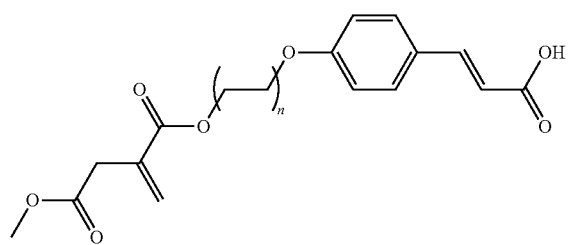
PRM-10

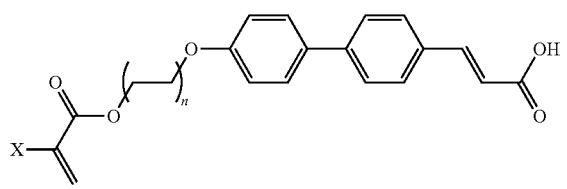
PRM-11

[Liquid Crystalline Side Chain Monomer]

The liquid crystalline side chain monomer used herein means a monomer such that, a polymer derived from the monomer exhibits liquid crystalline property and the polymer can form a hemogenic group in a side chain portion.

A hemogenic group in the side chain may be a group which forms a hemogenic structure by a single compound such as biphenyls, phenyl benzoates or the like; or a group which forms a hemogenic structure by hydrogen bonding between side chains, such as benzoic acids. Preferably, the hemogenic group in the side chain may be the following structures:

-continued

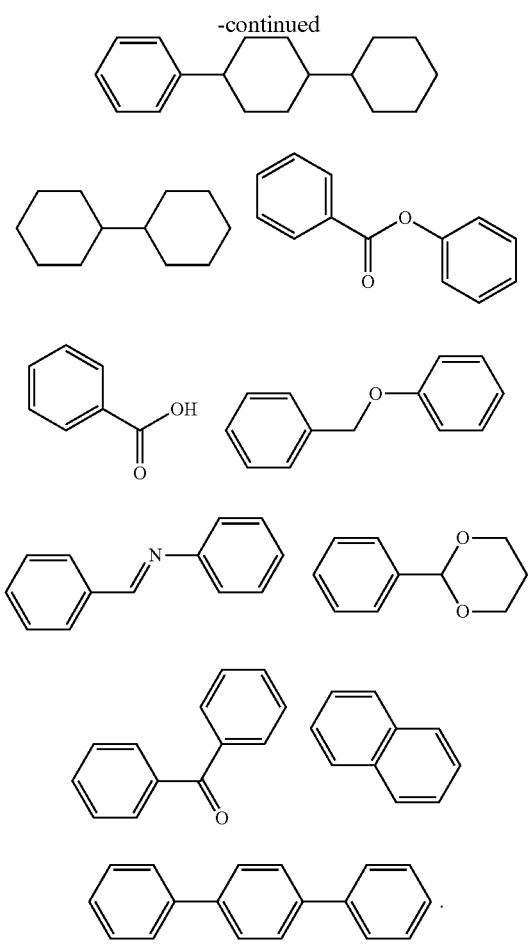

As a more specific example of the liquid crystalline side chain monomer, the liquid crystalline side chain monomer preferably has a structure having a polymerizable group formed of at least one selected from the group consisting of radically polymerizable groups such as hydrocarbons, (meth)acrylates, itaconates, fumarates, maleates, α-methylene-γ-butyrolactone, styrenes, vinyls, maleimides, and norbornenes and siloxanes, and a side chain formed of at least one of the above formulae (21) to (31).

Specific examples of the liquid crystalline side chain monomer may include, but are not limited to, compounds represented by the following formulae LCM-1 to LCM-9, wherein n represents an integer of 1 to 6, X represents a hydrogen atom or a methyl group, $R_4$, $R_6$, and $R_{61}$ to $R_{63}$ each independently represent a hydrogen atom, a linear or branched alkyl group or alkoxy group having 1 to 3 carbon atoms, a halogen atom, a cyano group, or a nitro group, $R_5$ represents a hydrogen atom, a linear or branched alkyl group having 1 to 6 carbon atoms.

LCM-1

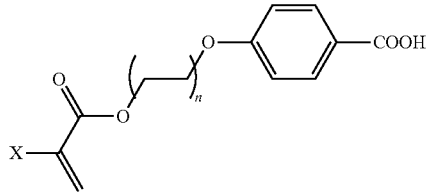

-continued

LCM-2

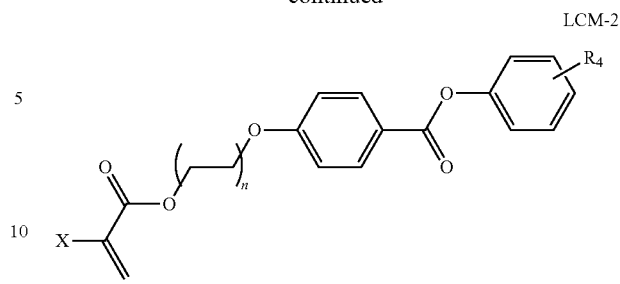

LCM-3

LCM-4

LCM-5

LCM-6

LCM-7

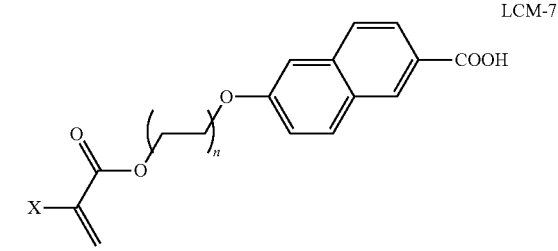

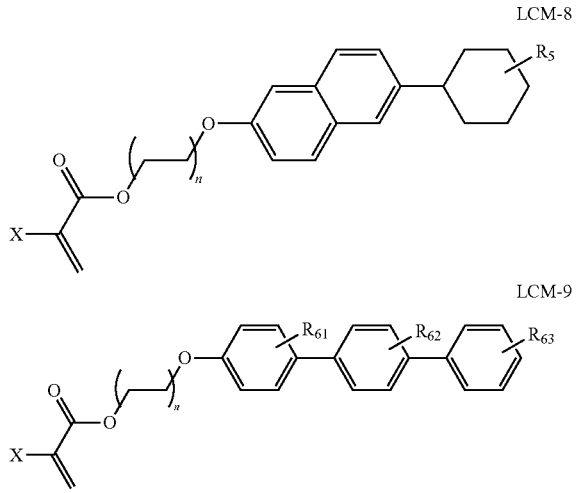

The component (A) can be obtained by a polymerization reaction of the above photoreactive side chain monomer exhibiting liquid crystalline property. Further, the component (A) can be obtained by copolymerizing a photoreactive side chain monomer exhibiting no liquid crystalline property and a liquid crystalline side chain monomer or copolymerizing a photoreactive side chain monomer exhibiting liquid crystalline property and a liquid crystalline side chain monomer. More, copolymerization with other monomer(s) can be performed in an extent not to impair an ability to exhibit liquid crystalline property.

Examples of the other monomer(s) may include an industrially available radically polymerizable monomer.

Specific examples of the other monomer(s) may include unsaturated carboxylic acids, acrylic acid ester compounds, methacrylic acid ester compounds, maleimide compounds, acrylonitriles, maleic anhydrides, styrene compounds, vinyl compounds and the like.

Specific examples of the unsaturated carboxylic acids may include acrylic acid, methacrylic acid, itaconic acid, maleic acid, fumaric acid and the like.

Examples of the acrylic acid ester compounds may include methyl acrylate, ethyl acrylate, isopropyl acrylate, benzyl acrylate, naphthyl acrylate, anthryl acrylate, anthrylmethyl acrylate, phenyl acrylate, 2,2,2-trifluoroethyl acrylate, tert-butyl acrylate, cyclohexyl acrylate, isobornyl acrylate. 2-methoxyethyl acrylate, methoxy triethylene glycol acrylate, 2-ethoxyethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, 8-ethyl-8-tricyclodecyl acrylate and the like.

Examples of the methacrylic acid ester compounds may include methyl methacrylate, ethyl methacrylate, isopropyl methacrylate, benzyl methacrylate, naphthyl methacrylate, anthryl methacrylate, anthrylmethyl methacrylate, phenyl methacrylate, 2,2,2-trifluoroethyl methacrylate, tert-butyl methacrylate, cyclohexyl methacrylate, isobornyl methacrylate, 2-methoxyethyl methacrylate, methoxy triethylene glycol methacrylate, 2-ethoxyethyl methacrylate, tetrahydrofurfuryl methacrylate, 3-methoxybutylmethacrylate, 2-methyl-2-adamantyl methacrylate, 2-propyl-2-adamantyl methacrylate, 8-methyl-8-tricyclodecyl methacrylate, 8-ethyl-8-tricyclodecyl methacrylate and the like. (Meth)acrylate compounds each having a cyclic ether group such as glycidyl (meth)acrylate, (3-methyl-3-oxetanyl) methyl (meth)acrylate, (3-ethyl-3-oxetanyl) methyl (meth)acrylate and the like can be also used.

Examples of the vinyl compounds may include vinyl ether, methyl vinyl ether, benzyl vinyl ether, 2-hydroxyethyl vinyl ether, phenyl vinyl ether, propyl vinyl ether and the like.

Examples of the styrene compounds may include styrene, methyl styrene, chlorostyrene, bromostyrene and the like.

Examples of the maleimide compounds may include maleimide, N-methyl maleimide, N-phenyl maleimide, N-cyclohexyl maleimide and the like.

A method for manufacturing the side chain type polymer according to the present embodiment is not particularly limited, but a general method used industrially can be used. Specifically, the side chain type polymer can be manufactured by cationic polymerization, radical polymerization, or anionic polymerization using a vinyl group of a liquid crystalline side chain monomer or a photoreactive side chain monomer. Among the methods, radical polymerization may be particularly preferable from a viewpoint of easiness of reaction control.

A polymerization initiator of radical polymerization may use a known compound such as a radical polymerization initiator, a reversible addition-fragmentation chain transfer (RAFT) polymerization reagent or the like.

A radical thermal polymerization initiator is a compound, which generates a radical by heating at a decomposition temperature or higher. Examples of the radical thermal polymerization initiator may include ketone peroxides (methyl ethyl ketone peroxide, cyclohexanone peroxide or the like), diacyl peroxides (acetyl peroxide, benzoyl peroxide or the like), hydroperoxides (hydrogen peroxide, tert-butyl hydroperoxide, cumene hydroperoxide or the like), dialkyl peroxides (di-tert-butyl peroxide, dicumyl peroxide, dilauroyl peroxide or the like), peroxy ketals (dibutyl peroxy cyclohexane or the like), alkyl peresters (peroxy neo decanoic acid-tert-butyl ester, peroxy pivalic acid-tert-butyl ester, peroxy 2-ethyl cyclohexanoic acid-tert-amyl ester or the like), persulfate salts (potassium persulfate, sodium persulfate, ammonium persulfate or the like), and azo compounds (azobisisobutyronitrile, 2,2'-di(2-hydroxyethyl) azobisisobutyronitrile or the like). Such a radical thermal polymerization initiator can be used singly or in combination of two or more thereof.

A radical photopolymerization initiator is not particularly limited as long as being a compound, which initiates radical polymerization by light irradiation. Examples of such radical photopolymerization initiator may include benzophenone, Michler's ketone, 4,4'-bis(diethylamino) benzophenone, xanthone, thioxanthone, isopropyl thioxanthone, 2,4-diethyl thioxanthone, 2-ethyl anthraquinone, acetophenone, 2-hydroxy-2-methyl propiophenone, 2-hydroxy-2-methyl-4'-isopropyl propiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-[4-(methylthio) phenyl]-2-morpholinopropan-1-one, 2-benzyl-2-dimethylamino-1- (4-morpholinophenyl)-butanone-1, 4-dimethylamino ethyl benzoate, 4-dimethylamino isoamyl benzoate, 4,4'-di(t-butylperoxy carbonyl) benzophenone, 3,4,4'-tri(t-butyl peroxy carbonyl) benzophenone, 2,4,6-trimethylbenzoyl diphenyl phosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-(p-

N,N-di(ethoxycarbonylmethyl))-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl) benzothiazole, 2-mercaptobenzothiazole, 3,3'-carbonyl bis (7-diethylamino coumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylamino propionyl) carbazole, 3,6-bis(2-methyl-2-morpholino propionyl)-9-n-dodecyl carbazole, i-hydroxycyclohexyl phenyl ketone, bis(5-2,4-cyclopentadiene-1-yl)-bis(2,6-difluoro-3-(1H-pyrrole-1-yl)-phenyl)titanium, 3,3',4,4'-tetra(t-butyl peroxycarbonyl)benzophenone, 3,3',4,4'-tetra(t-hexylperoxycarbonyl) benzophenone, 3,3'-di(methoxycarbonyl)-4,4'-di(t-butylperoxy carbonyl)benzophenone, 3,4'-di(methoxycarbonyl)-4,3'-di(t-butylperoxy carbonyl)benzophenone, 4,4'-di(methoxycarbonyl)-3,3'-di(t-butylperoxy carbonyl)benzophenone, 2-(3-methyl-3H-benzothiazol-2-ylidene)-1-naphthalen-2-yl-ethanone, 2-(3-methyl-1,3-benzothiazole-2(3H)-ylidene)-1-(2-benzoyl) ethanone and the like. These compounds can be used singly or in combination of two or more compounds thereof.

A radical polymerization method is not particularly limited, but examples thereof may include an emulsion polymerization method, a suspension polymerization method, a dispersion polymerization method, a precipitation polymerization method, a bulk polymerization method, a solution polymerization method and the like.

An organic solvent used for a generation reaction of the component (A), specifically a polymerization reaction of the above monomer is not particularly limited as long as a generated polymer can be dissolved therein. Specific examples thereof may include the following:

N,N-dimethylformamide, N,N-dimethylacetamide, N-methyl-2-pyrrolidone, N-ethyl-2-pyrrolidone, N-methyl caprolactam, dimethyl sulfoxide, tetramethylurea, pyridine, dimethyl sulfone, hexamethyl sulfoxide, γ-butyrolactone, isopropyl alcohol, methoxymethyl pentanol, dipentene, ethyl amyl ketone, methyl nonyl ketone, methyl ethyl ketone, methyl isoamyl ketone, methyl isopropyl ketone, methyl cellosolve, ethyl cellosolve, methyl cellosolve acetate, ethyl cellosolve acetate, butyl carbitol, ethyl carbitol, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene, glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxy butanol, diisopropyl ether, ethyl isobutyl ether, diisobutylene, amyl acetate, butyl butyrate, butyl ether, diisobutyl ketone, methylcyclohexene, propyl ether, dihexyl ether, dioxane, n-hexane, n-pentane, n-octane, diethyl ether, cyclohexanone, ethylene carbonate, propylene carbonate, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methyl ethyl 3-ethoxypropionate, ethyl 3-methoxy propionate, 3-ethoxypropionic acid, 3-methoxypropionic acid, propyl 3-methoxy propionate, butyl 3-methoxy propionate, diglyme, 4-hydroxy-4-methyl-2-pentanone, 3-methoxy-N,N-dimethyl propanamide, 3-ethoxy-N,N-dimethyl propanamide, 3-butoxy-N,N-dimethyl propanamide and the like.

These organic solvents may be used singly or in mixture thereof. Further, even a solvent which does not dissolve a generated polymer may be used within a range not to make the generated polymer precipitate while being mixed with the above organic solvents.

Oxygen in an organic solvent inhibits a polymerization reaction in radical polymerization. Therefore, an organic solvent which has been degassed to a possible extent may be preferably used.

A polymerization temperature in radical polymerization may select any temperature in a range of 30° C. to 150° C., but a temperature in a range of 50° C. to 100° C. may be preferable. A reaction can be performed at any concentration. However, when the concentration is too low, it is difficult to obtain a polymer having a high molecular weight. When the concentration is too high, the viscosity of a reaction liquid is too high, and uniform stirring is difficult. Therefore, the monomer concentration is preferably from 1% by mass to 50% by mass, and more preferably from 5% by mass to 30% by mass. The reaction may be performed at a high concentration in an initial stage of the reaction, and thereafter, an organic solvent can be added.

In the above radical polymerization reaction, a large ratio of a radical polymerization initiator with respect to a monomer makes a molecular weight of a polymer obtained small, and a small ratio of the radical polymerization initiator makes the molecular weight of the polymer obtained large. Therefore, the ratio of a radical initiator may be preferably from 0.1 mol % to 10 mol % with respect to a monomer to be polymerized. In polymerization, various monomer components, solvents, initiators and the like can be added.

[Recovery of Polymer]

In order to recover a product obtained by the above reaction, that is, the component (A) from a reaction solution, the reaction solution may be put into a poor solvent.

Examples of the poor solvent used for precipitation may include methanol, acetone, hexane, heptane, butyl cellosolve, heptane, methyl ethyl ketone, methyl isobutyl ketone, ethanol, toluene, benzene, diethyl ether, methyl ethyl ether, water and the like.

A polymer precipitated by putting the reaction solution into the poor solvent is recovered by filtration, and then may be dried at normal or reduced pressure and at normal temperature or by heating. By repeating an operation for redissolving the precipitated, recovered polymer in an organic solvent, followed by reprecipitating and recovering the polymer two to ten times, impurities in the polymer may be reduced. In this case, examples of the poor solvent may include alcohols, ketones, hydrocarbons and the like. Use of three or more of the poor solvents selected therefrom is preferable because a purification efficiency is further increased.

As for a molecular weight of the component (A) according to the present invention, a weight average molecular weight determined by a gel permeation chromatography (GPC) method may be preferably from 2000 to 1000000, and more preferably from 5000 to 200000.

As described above, the photoreactive liquid crystal composition according to the present invention may include other components other than the component (A) or (B).

Examples of the other components may include, depending on the component (A) and the component (B) used, application of the photoreactive liquid crystal composition and the like, antioxidants such as hindered amines or hindered phenols; polymerizable compounds each having a photopolymerizable group or a photocrosslinkable group on one or more terminals, and the like.

Specific examples of the polymerizable compounds may include, but are not limited to, the following compounds, wherein V represents a single bond or —$R_8O$—, preferably —$R_8O$—, wherein $R_8$ represents a linear or branched alkylene group having 1 to 10, preferably 2 to 6 carbon atoms; W represents a single bond or $OR_9$—, preferably —$OR_9$—, wherein $R_9$ represents a linear or branched alkylene group having 1 to 10, preferably 2 to 6 carbon atoms; V and W may have the same structure as or different structures from each other, but synthesis is easy when V and W have the same structure; and $R_7$ represents H or an alkyl group having 1 to 4 carbon atoms.

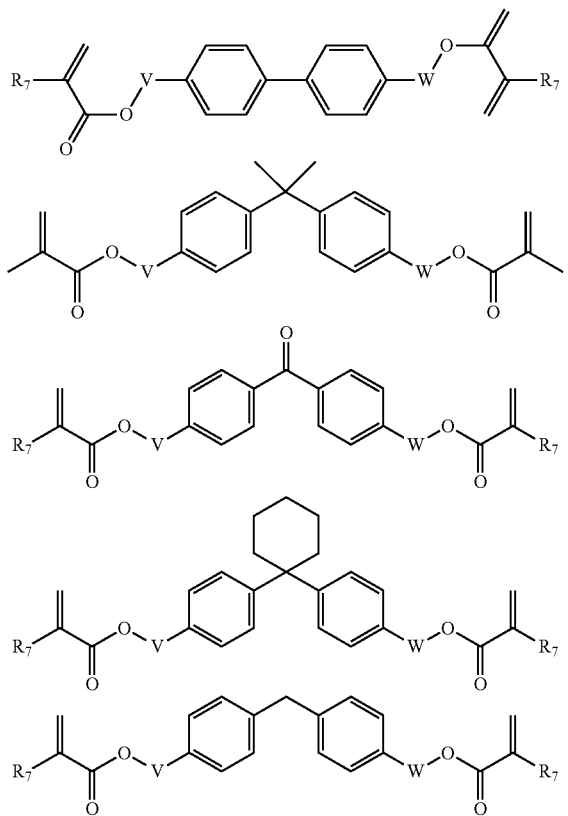

<Element Obtained by Photoreactive Liquid Crystal Composition and Method for Manufacturing the Same>

The present application also provides an element obtained by the above photoreactive liquid crystal composition and a method for manufacturing the element.

The element according to the present invention comprises and is formed of a liquid crystal cell comprising the above photoreactive liquid crystal composition.

Examples of the element may include a display element; an optical element such as a diffraction grating, a lens, a mirror or the like; or the like.

The element, specifically a display element or an optical element according to the present invention can be formed by filling the above photoreactive liquid crystal composition into a liquid crystal cell.

Specifically, the element according to the present invention can be manufactured by the following steps:

[I] filling a photoreactive liquid crystal composition comprising (A) a photoreactive polymer liquid crystal having a photoreactive side chain, which causes at least one reaction selected from the group consisting of (A-1) photocrosslinking and (A-2) photoisomerization; and (B) a low molecular liquid crystal; into a space formed between two transparent substrates disposed in parallel and apart from each other, to form a liquid crystal cell; and

[II] irradiating the liquid crystal cell obtained in the step [I] with a polarized ultraviolet ray from one of the two transparent substrates;

to form the element according to the present invention, specifically the element having a predetermined orientation of the (B) low molecular liquid crystal in the liquid crystal cell.

The step [I] is a step of filling the above photoreactive liquid crystal composition into a space formed between two transparent substrates, in which at least one substrate on a side which is irradiated with an ultraviolet ray is transparent, disposed in parallel and apart from each other, to form a liquid crystal cell.

The liquid crystal cell has the space by disposing the two transparent substrates apart, from each other to some extent in parallel, and is formed by filling the above photoreactive composition into the space.

Examples of the substrate may include glass and a plastic such as acrylic resins, polycarbonates or the like. The substrate may have flexibility depending on an element formed.

The substrate may comprise various films, for example, a film formed of polyvinyl alcohol, polyether, polyethylene, PET, polyamide, polyimide, an acrylic resin, polycarbonate, or polyurea on a side of the space depending on an element formed. For example, the film used herein may exhibit the following effect. In order to induce a photoreaction of the (A) photoreactive polymer liquid crystal in the step [II] described hereinafter, a molecular long axis of the (A) photoreactive polymer liquid crystal may be positioned horizontally in a surface of the substrate so as to absorb polarized light. On the other hand, since the (A) photoreactive polymer liquid crystal is encapsulated in the liquid crystal cell as a composition with the (B) low molecular liquid crystal, in order to make the molecular long axis of the (A) photoreactive polymer liquid crystal positioned horizontally in the surface of the substrate, the (B) low molecular liquid crystal may be also positioned horizontally in the surface of the substrate. Therefore, the above film may be a film in which the molecular long axis of the photoreactive composition may be positioned horizontally in the surface of the substrate. A material of the film is not limited as long as the film is such a film.

The step [II] is a step of irradiating the liquid crystal cell obtained in the step [I] with a polarized ultraviolet ray. The polarized ultraviolet ray is emitted from an outside of one of the two transparent substrates. Therefore, as described above, the transparent substrates may transmit a polarized ultraviolet ray.

A wavelength range of the polarized ultraviolet ray, depending on an element formed, may be 100 nm to 400 nm. It is preferable to select an optimal wavelength through a filter or the like according to the kind of a coating film used. For example, an ultraviolet ray in a wavelength range of 290 nm to 400 nm can be selected to be used such that a photocrosslinking reaction can be induced selectively. Examples of the ultraviolet ray include light emitted from a high pressure mercury lamp.

By irradiating a first position of an optical element, and a second position, which is different from the first position, with different polarized ultraviolet rays, it is possible to form an element, for example, an optical element, having the (B) low molecular liquid crystal with different orientations between the first and second positions of the element.

Specifically, by irradiating the first position with a polarized ultraviolet ray having a first polarizing axis and irradiating the second position with a polarized ultraviolet ray having a second polarizing axis, which is different from the first polarizing axis, it is possible to form an element, for example, an optical element, having the (B) low molecular liquid crystal with different orientations between the first and second positions of the element.

Further, for example, in a case where an element formed is a diffraction grating, by being subject to interference exposure of a polarized ultraviolet ray to the liquid crystal cell, it is possible to form a diffraction grating which is an optical element having an orientation distribution in which orientation is different depending on the position of the element, specifically having an orientation distribution in which orientation is periodically changed.

When a liquid crystal cell is irradiated with a polarized ultraviolet ray, it is considered that the following mechanism occurs in the liquid crystal cell. The (A) photoreactive polymer liquid crystal in the liquid crystal cell has orientation according to the polarized ultraviolet ray.

The (B) low molecular liquid crystal is oriented according to the orientation of the (A) photoreactive polymer liquid crystal.

The (A) photoreactive polymer liquid crystal and the (B) low molecular liquid crystal thereby have orientation according to the polarized ultraviolet ray.

For example, as described above, by being subject, to interference exposure to a polarized ultraviolet ray to the liquid crystal cell, the (A) photoreactive polymer liquid crystal has different orientation depending on the position of an element, and in accordance therewith, the (B) low molecular liquid crystal also has different orientation depending on the position of the element. Therefore, by being subject to interference exposure to a polarized ultraviolet ray to the liquid crystal cell, it is possible to form a diffraction grating which is an optical element having an orientation distribution in which orientation is different depending on the position of the element, specifically having an orientation distribution in which orientation is periodically changed.

EXAMPLES

Example 1

One part by weight of a photoreactive polymer liquid crystal represented by formula PRP-1a was added to 99 parts by weight of 4-n-pentyl-4'-cyanobiphenyl (5CB) which was a low molecular liquid crystal. Then, the resulting mixture was stirred at 180° C. for 20 minutes to obtain a photoreactive liquid crystal composition.

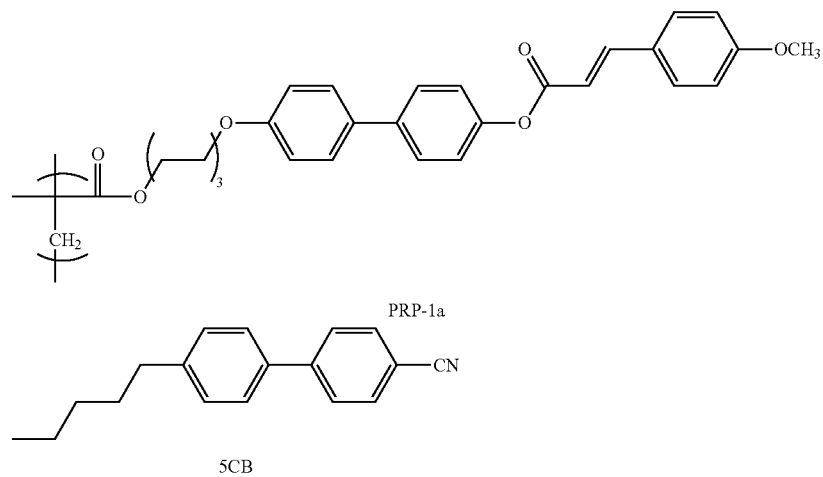

PRP-1a

5CB

Then, the photoreactive liquid crystal composition was encapsulated in a parallel flat plate cell formed of two glass substrates having a 5 μm gap with an ITO on both inner surfaces of the substrate, to form a liquid crystal cell.

The resulting liquid crystal cell was subjected to polarizing hologram exposure to form a one-dimensional phase grating. The hologram exposure was performed according to the optical path diagram illustrated in FIG. 1. In FIG. 1, "HWP" indicates a half-wave plate, "QWP" indicates a quarter-wave plate, "M" indicates a mirror, and "PBS" indicates a polarization beam splitter.

Specifically, linearly polarized He-Cd laser light (0.47 W/cm$^2$) having a wavelength of 325 nm was used as an exposure light source. This laser beam was divided into two light waves having an equal intensity by a beam splitter, and then a polarization state was confirmed with a wave plate. Then, interference was performed in the cell for 70 seconds. Each of incident angles of the two light waves was ±0.75° (a grating pitch was 12 μm). Furthermore, an incident surface of the two light waves was referred to as an xz-plane, and a normal vector to substrate and a grating vector were made parallel to a z-direction and an x-direction, respectively.

Figure 2:
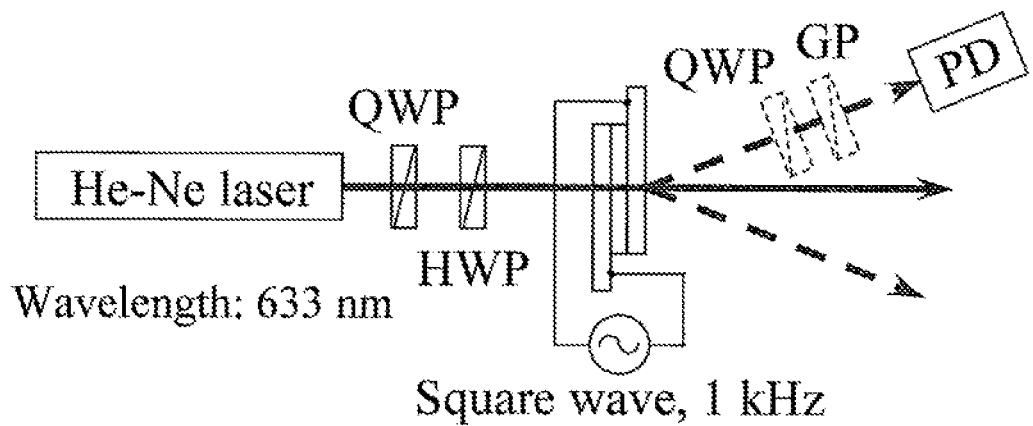
FIG. 2 illustrates a schematic diagram for measuring an intensity of transmitted diffracted light of a liquid crystal cell obtained after interference exposure in Example 1 and Comparative Example 1.

After the interference exposure, linearly polarized laser light having a wavelength of 633 nm as a probe light was irradiated vertically to the liquid crystal cell, to determine an intensity of transmitted diffraction light. FIG. 2 illustrates an optical path diagram for the determination. In FIG. 2, "HWP" and "QWP" have been described above, "GP" indicates a Glan-Thompson prism, and "PD" indicates a photodetector. Specifically, a homogeneous orientation cell having a cell thickness of 5 μm was disposed such that a director was parallel to the y-axis. A diffraction efficiency (intensity ratio between diffracted light and incident light) in +1 order diffraction when a grating was recorded by interference of two light waves in s-polarized light was determined.

Figure 3:
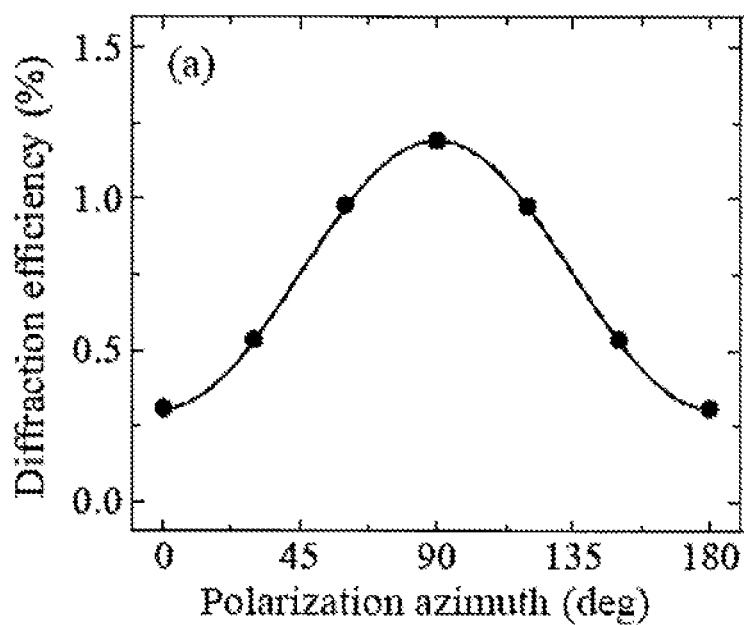
FIG. 3 is a graph illustrating polarization azimuths dependence of a diffraction efficiency of the liquid crystal cell obtained after interference exposure.
Figure 4:
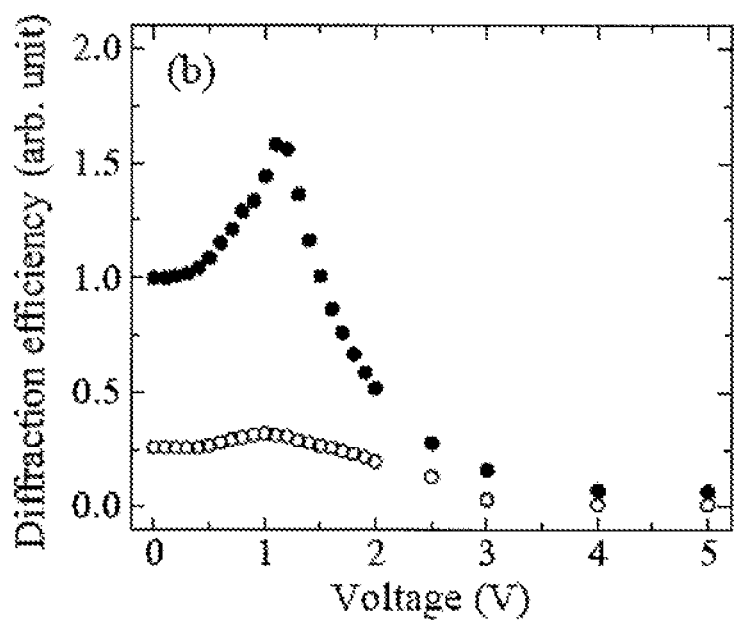
FIG. 4 is a graph illustrating measurement results of a diffraction efficiency when a rectangular voltage of 1 kHz is applied.

FIGS. 3 and 4 illustrate measurement results thereof.

FIG. 3 illustrates the diffraction efficiency depending on polarization azimuth of the probe linearly polarized light (the x-direction is 0° and the y-direction is 90°). FIG. 3 shows that the diffraction efficiency largely depends on a polarization state of incident light, suggesting that anisotropic refractive index modulation has been formed in the cell.

FIG. 4 illustrates results of the diffraction efficiency when a rectangular voltage of 1 kHz was applied (when a voltage was increased). It is confirmed from FIG. 4 that the diffraction efficiency can be controlled by application of a voltage.

Comparative Example 1

Hologram recording was performed in a manner similar to Example 1 except that the liquid crystal composition encapsulated in the parallel flat plate cell was only 5CB, to determine an intensity of transmitted diffraction light. As a result, a diffraction phenomenon was not observed in probe linearly polarized light in any condition.

Example 1 and Comparative Example 1 show that the liquid crystal composition according to the present invention, i.e., the liquid crystal composition in Example 1 including the (A) photoreactive polymer liquid crystal and the (B) low molecular liquid crystal has photoreactivity, but the liquid crystal composition in Comparative Example 1 does not exhibit photoreactivity. Further, it has been found that a diffraction grating can be manufactured by using the liquid crystal composition in Example 1.

What is claimed is:

1. A photoreactive liquid crystal composition comprising:
   (A) a photoreactive polymer liquid crystal having a photoreactive side chain, which reacts by at least one reaction selected from the group consisting of (A-1) photocrosslinking, and (A-2) photoisomerization; and
   (B) a low molecular liquid crystal,
   wherein the (A) photoreactive polymer liquid crystal comprises a rigid mesogenic component,
   wherein the (A) photoreactive polymer liquid crystal comprises any one photoreactive side chain selected from the group consisting of the following formulae (11) to (13):

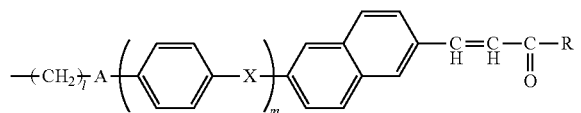
(11)

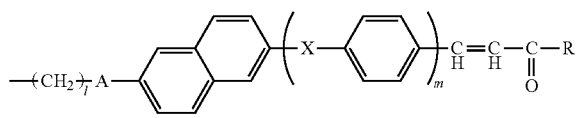
(12)

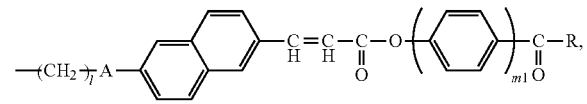
(13)

wherein A independently represents a single bond, —O—, —CH$_2$—, —COO—, —OCO—, —CONH—, —NH—CO—, —CH=CH—CO—O—, or —O—CO—CH=CH—;

B represents —O—, —CH$_2$—, —COO—, —OCO—, —CONH—, —NH—CO—, —CH=CH—CO—O—, or —O—CO—CH=CH—;

X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;

l represents an integer of 1 to 12, m represents an integer of 0 to 2, and m1 represents an integer of 1 to 3; and R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ wherein R$_0$ represents a hydrogen atom or an alkyl group having 1 to 5 carbon atoms, —NO$_2$, —CN, —CH=C(CN)$_2$, —CH=CH—CN, a halogen group, an alkyl group having 1 to 5 carbon atoms, or an alkyloxy group having 1 to 5 carbon atoms, a hydroxy group, or an alkoxy group having 1 to 6 carbon atoms.

2. The composition according to claim 1, wherein the (A) photoreactive polymer liquid crystal comprises a photoreactive side chain, which reacts by the (A-1) photocrosslinking reaction.

3. The composition according to claim 1, wherein a weight ratio of the (A) photoreactive polymer liquid crystal and the (B) low molecular liquid crystal is 0.1:99.9 to 20:80.

4. A display element comprising a liquid crystal cell comprising the photoreactive liquid crystal composition according to claim 1.

5. A display element comprising a liquid crystal cell comprising the photoreactive liquid crystal composition according to claim 1, wherein the (B) low molecular liquid crystal has predetermined orientation in the liquid crystal cell.

6. An optical element comprising a liquid crystal comprising the photoreactive liquid crystal composition according to claim 1.

7. An optical element comprising a liquid crystal cell comprising the photoreactive liquid crystal composition according to claim 1, wherein the (B) low molecular liquid crystal has predetermined orientation in the liquid crystal cell.

8. The optical element according to claim 7, wherein the predetermined orientation has an orientation distribution in which orientation is different depending on the position of the optical element.

9. A method for manufacturing an optical element, comprising:
[I] filling a photoreactive liquid crystal composition comprising
(A) a photoreactive polymer liquid crystal having a photoreactive side chain, which reacts by at least one reaction selected from the group consisting of (A-1) photocrosslinking and (A-2) photoisomerization, and
(B) a low molecular liquid crystal
into a space formed between two transparent substrates disposed in parallel and apart from each other, to form a liquid crystal cell; and
[II] irradiating the liquid crystal cell with a polarized ultraviolet ray from one of the two transparent substrates,
to form the optical element having a predetermined orientation of the (B) low molecular liquid crystal in the liquid crystal cell,
wherein the (A) photoreactive polymer liquid crystal comprises any one photoreactive side chain selected from the Croup consisting of the following formulae (11) to (13):

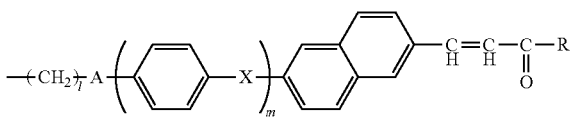
(11)

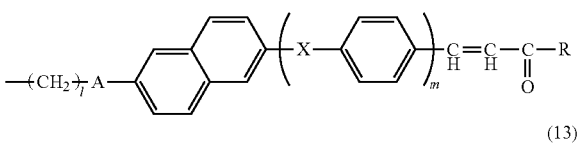
(12)

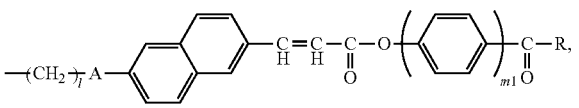
(13)

wherein A independently represents a single bond, —O—, —CH$_2$—, —COO—, —OCO—, —CONH—, —NH—CO—, —CH=CH—CO—O—, or —O—CO—CH=CH—;
B represents —O—, —CH$_2$—, —COO—, —OCO—, —CONH—, —NH—CO—, —CH=CH—CO—O—, or —O—CO—CH=CH—;
X represents a single bond, —COO—, —OCO—, —N=N—, —CH=CH—, —C≡C—, —CH=CH—CO—O—, or —O—CO—CH=CH—, and in a case where the number of X is 2, these Xs may be the same or different;
l represents an integer of 1 to 12, m represents an integer of 0 to 2, and m1 represents an integer of 1 to 3; and
R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ wherein R$_0$ represents a hydrogen atom or an alkyl group having 1 to 5 carbon atoms, —NO$_2$, —CN, —CH=C(CN)$_2$, —CH=CH—CN, a halogen group, an alkyl group having 1 to 5 carbon atoms, or an alkyloxy group having 1 to 5 carbon atoms, a hydroxy group, or an alkoxy group having 1 to 6 carbon atoms.

10. The method according to claim 9, wherein the irradiating [II] comprises:
setting a polarizing axis of a polarized ultraviolet ray with respect to a first position of the optical element as a first axis; and
setting a polarizing axis of a polarized ultraviolet ray with respect to a second position, which is different from the first position of the optical element, as a second axis, which is different from the first axis,
to form the optical element having the (B) low molecular liquid crystal with different orientations between the first and second positions of the optical element.

11. The method according to claim 9, wherein, the irradiating [II] comprises:
subjecting the liquid crystal cell to interference exposure of the polarized ultraviolet ray, the predetermined orientation having an orientation distribution in which orientation is different depending on the position of the optical element.

12. A method for manufacturing a display element, comprising:
[I] filling a photoreactive liquid crystal composition comprising
(A) a photoreactive polymer liquid crystal having a photoreactive side chain, which reacts by at least one reaction selected from the group consisting of (A-1) photocrosslinking and (A-2) photoisomerization, and
(B) a low molecular liquid crystal
into a space formed between two transparent substrates disposed in parallel and apart from each other, to form a liquid crystal cell; and
[II] irradiating the liquid crystal cell with a polarized ultraviolet ray from one of the two transparent substrates,
to form the display element having a predetermined orientation of the (B) low molecular liquid crystal in the liquid crystal cell,
wherein the (A) photoreactive polymer liquid crystal comprises any one photoreactive side chain selected from the group consisting of the following formulae (11) to (13):

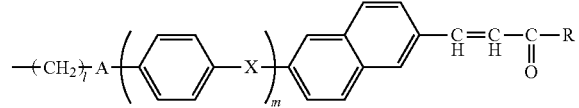
(11)

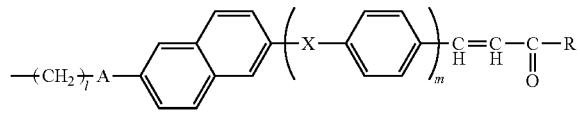
(12)

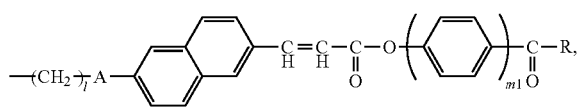
(13)

wherein A independently represents a single bond, —O—, —CH$_2$—, —COO—, —OCO—, —CONH—, —NH—CO—, —CH═CH—CO—O—, or —O—CO—CH═CH—;

B represents —O—, —CH$_2$—, —COO—, —OCO—, —CONH—, —NH—CO—, —CH═CH—CO—O—, or —O—CO—CH═CH—;

X represents a single bond, —COO—, —OCO—, —N═N—, —CH═CH—, —C≡C—, —CH═CH—CO—O—, or —O—CO—CH═CH—, and in a case where the number of X is 2, these Xs may be the same or different;

l represents an integer of 1 to 12, m represents an integer of 0 to 2, and m1 represents an integer of 1 to 3; and R represents a ring selected from a monovalent benzene ring, a monovalent naphthalene ring, a monovalent biphenyl ring, a monovalent furan ring, a monovalent pyrrole ring and a monovalent alicyclic hydrocarbon having 5 to 8 carbon atoms, or a group in which the same or different two to six rings selected therefrom are bonded through a bonding group B, wherein a hydrogen atom bonded thereto may be each independently replaced with —COOR$_0$ wherein R$_0$ represents a hydrogen atom or an alkyl group having 1 to 5 carbon atoms, —NO$_2$, —CN, —CH═C(CN)$_2$, —CH═CH—CN, a halogen group, an alkyl group having 1 to 5 carbon atoms, or an alkyloxy group having 1 to 5 carbon atoms, a hydroxy group, or an alkoxy group having 1 to 6 carbon atoms.

13. The photoreactive liquid crystal composition according to claim 1, wherein the (A) photoreactive polymer liquid crystal has at least one selected from the following characteristics i) to iv)

i) the (A) photoreactive polymer liquid crystal is a polymer exhibiting liquid crystalline property in a predetermined temperature range and having a photoreactive side chain, ii) the (A) photoreactive polymer liquid crystal reacts by light in a wavelength range of 250 nm to 400 nm and exhibits liquid crystalline property in a temperature range of 50 to 300° C., iii) the (A) photoreactive polymer liquid crystal has a photoreactive side chain to react with light in a wavelength range of 250 run to 400 nm, and/or iv) the (A) photoreactive polymer liquid crystal iv) has a mesogenic group in order to exhibit liquid crystalline property in a temperature range of 50 to 300° C.

* * * * *